Dec. 15, 1970  JAMES E. WEBB  3,546,920
ADMINISTRATOR OF THE NATIONAL AERONAUTICS
AND SPACE ADMINISTRATION
APPARATUS FOR TESTING POLYMERIC MATERIALS
Filed March 11, 1968  4 Sheets-Sheet 1

INVENTOR.
RAFFAELE F. MURACA

BY

ATTORNEYS

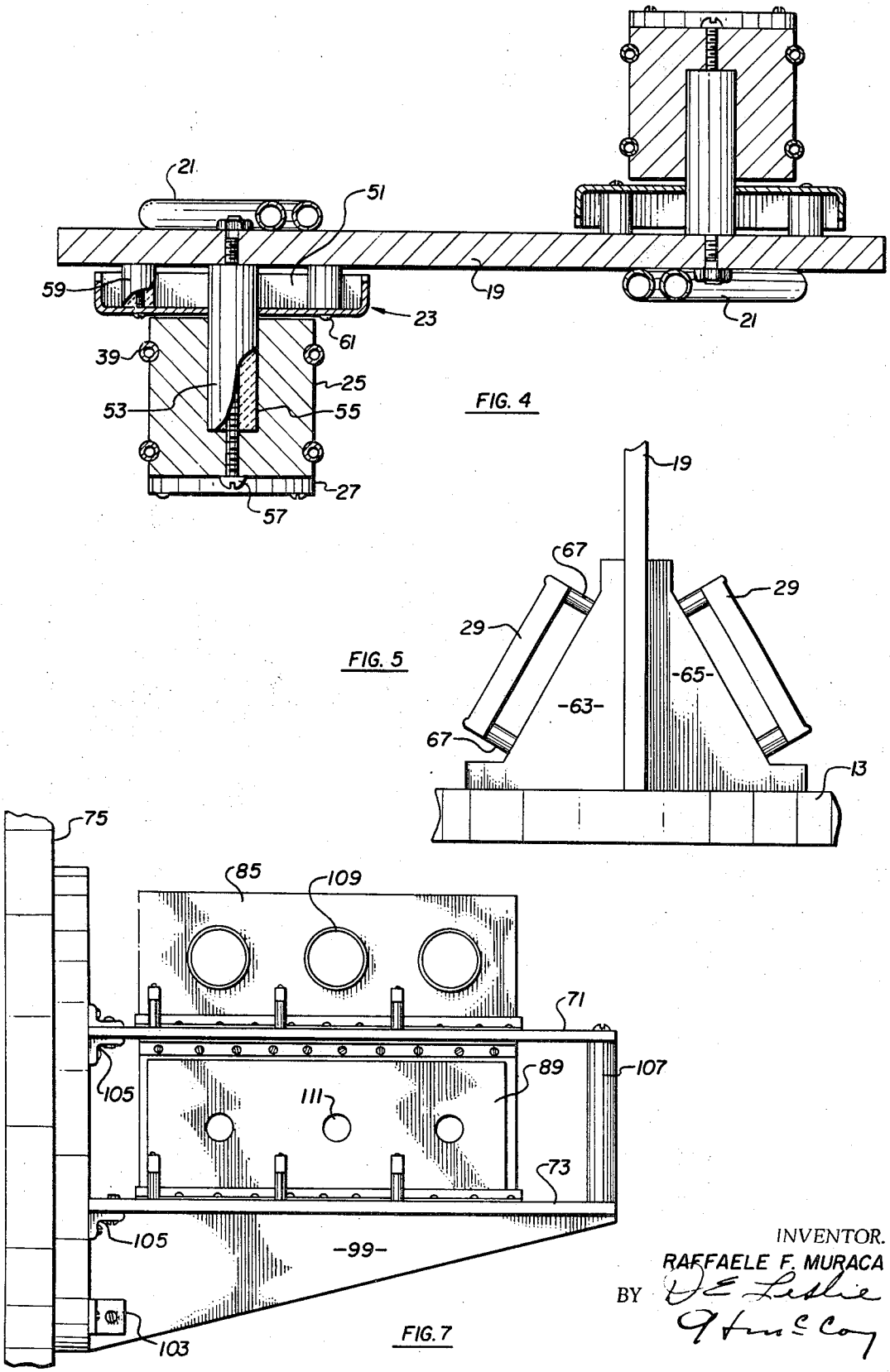

Dec. 15, 1970  JAMES E. WEBB  3,546,920
ADMINISTRATOR OF THE NATIONAL AERONAUTICS
AND SPACE ADMINISTRATION
APPARATUS FOR TESTING POLYMERIC MATERIALS
Filed March 11, 1968  4 Sheets-Sheet 3

INVENTOR.
RAFFAELE F. MURACA
BY
ATTORNEYS

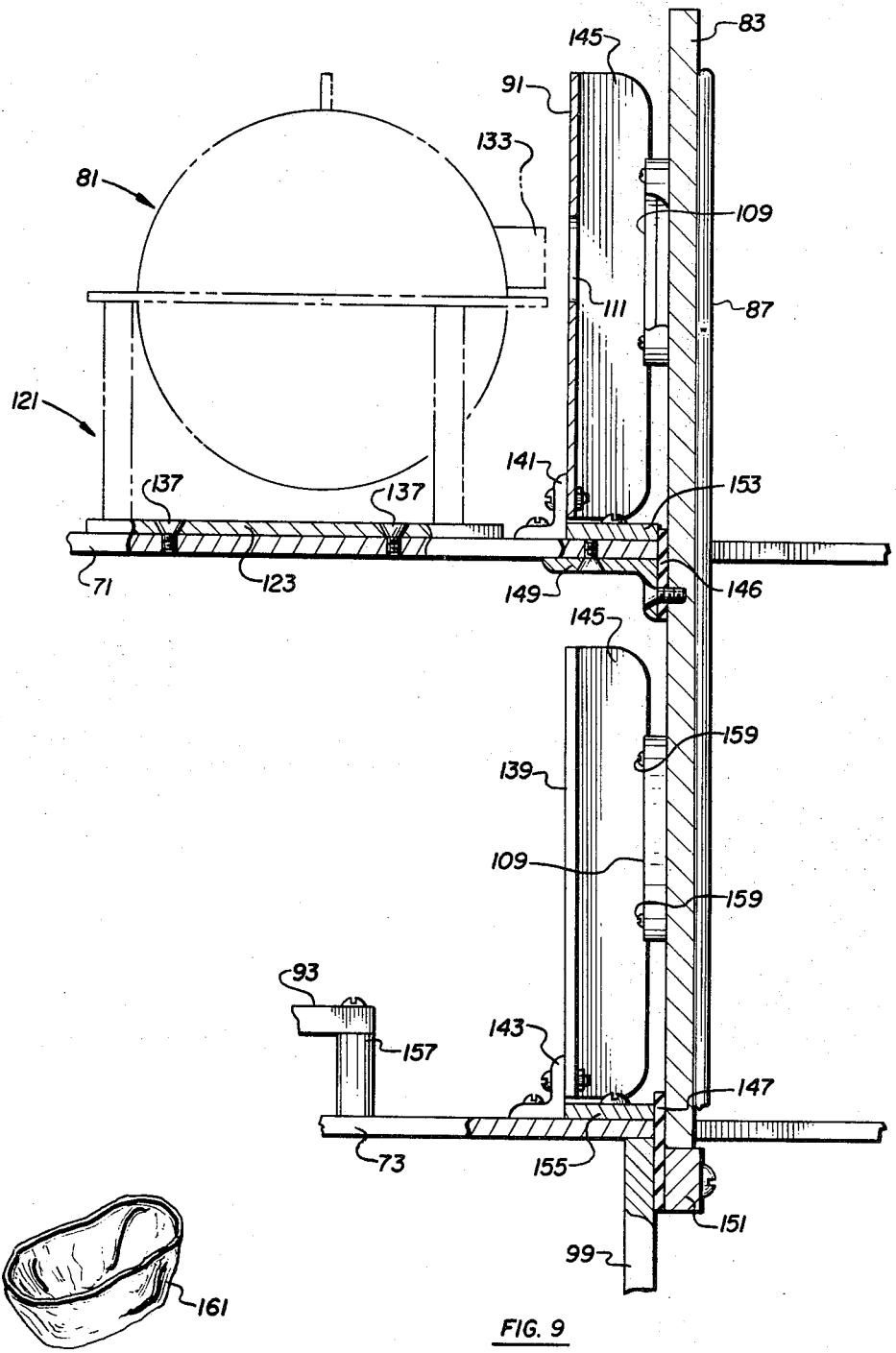

United States Patent Office 3,546,920
Patented Dec. 15, 1970

3,546,920
APPARATUS FOR TESTING POLYMERIC
MATERIALS
James E. Webb, Administrator of the National Aeronautics and Space Administration, with respect to an invention of Raffaele F. Muraca, Santa Clara, Calif.
Filed Mar. 11, 1968, Ser. No. 711,972
Int. Cl. G01n 25/02
U.S. Cl. 73—17        9 Claims

ABSTRACT OF THE DISCLOSURE

Apparatus for determining the volatile condensable material present in polymeric products consisting of a plurality of chambers which are controllably heated for holding the samples of polymeric material. Each chamber communicates with a removable plate which is controllably cooled so that condensables driven off from the polymeric material in the chamber will deposit and remain on the cooled plates. The entire apparatus is operated under a vacuum whereby the volatile non-condensable gaseous material driven off from the samples is withdrawn from the system. Weighing of the plates before and after indicate the amount of volatile condensable material driven from the polymeric samples. There are two embodiments of the invention: One for the testing of smaller micro samples of a polymer, and a second embodiment for testing of large pieces of material, referred to as macro samples.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

Field of the invention

This invention relates to chemical testing apparatus and more particularly to a method and apparatus which can be used for determining the amount of volatile condensable material lost by polymeric materials in a thermal-vacuum environment which simulates space conditions.

Description of the prior art

In outer space, a thermal-vacuum environment often has serious effects upon polymeric materials. Polymers are found to lose matter by outgassing and by evaporation or sublimation in this environment. A significant loss of weight of a polymeric material is normally indicative of a severe change in its physical properties and thus perhaps unsuitability in a high temperature vacuum environment. If the material lost by the polymers is condensable, the test chambers will be contaminated by the vaporized substances and a spacecraft may be rendered inoperative if such polymers are incorporated as structural elements. As a result it is important to determine in laboratory test procedures the suitability of a polymer in terms of both its loss of weight and the amount of volatile condensable material given off during exposure to a thermal-vacuum environment which simulates that encountered in space. It is relatively easy to obtain the percent loss of weight of a polymer material when subjected to simulated space environment. This, however, does not in any way reveal the type of materials being released by the polymer but will normally indicate the general suitability of a material when the loss is small. Normally, it is assumed that if the loss of weight is less than 1% in the thermal-vacuum environment, the polymeric material is suitable for spacecraft application.

When greater than 1% loss of weight occurs, concern is had for the effect upon both the physical properties of the polymer and the amount and type of materials given off. The matter released by the polymer could be ordinary gases, such as adsorbed air or carbon dioxide, ordinary liquids of relatively high vapor pressure such as water or solvents, and liquids or solids of relatively high molecular weight and low vapor pressure such as lubricating oils, plasticizers, and the like. Polymers which suffer sizable weight losses normally release substances which condense on cooler surfaces and interfere with spacecraft functions. These substances are referred to as volatile condensable material (VCM). Generally the volatile condensable material, VCM, can be defined as the weight of condensate obtainable at 125° C. in a vacuum of at least $5 \times 10^{-6}$ torr. The temperature of 125° C. is selected as an upper limit which might be encountered in spacecraft applications, but it is pointed out that spacecraft are generally designed to maintain environmental temperatures of about 25° C. However, in the area of power dissipating components, much higher temperatures can be encountered. Thus, the migration of volatilized substances between spacecraft components operating at different temperatures is quite possible. In view of this, it is necessary to screen every polymer which is used in spacecraft to determine whether it releases materials that can condense and seriously affect the spacecraft's functions.

Prior to the herein invention there was no suitable method for rapidly obtaining a determination as to the loss of weight and generation of volatile condensable materials in polymers, encountering simulated space environments. At most, the determinations were made on small laboratory bench scale equipment, involving testing only a single sample at a time under conditions which were not reproducible and not simulative of the space environment. In order to assure accuracy of a test such as that referred to, several samples of a polymer must be subjected to the same identical conditions. This was virtually impossible under prior techniques of testing one sample separately at a time. Additionally, there were no prior art methods available for sufficiently testing simultaneously a number of samples of larger size polymeric material, such as pieces of previous fabricated hardware. Additionally, the prior art methods that did exist did not lend themselves to testing for the amount of volatile condensable material obtained over varying lengths of time. In order for this to be successfully done, there must be assurance that the repeatability in the testing procedure is sufficient so that a sample which was tested for an interval of time of the order of 24 hours is subjected to the same conditions as a second sample of the same material which might be subjected to the conditions for two or more multiples of 24 hours. As can be imagined, there are virtually thousands of polymeric materials available for space applications with additional ones being contributed at a constant rate as technology develops. As a result, it is important that an efficient and rapid means for screening of the polymeric materials exist which will assure extreme accuracy.

Thus, it is an object of this invention to provide an apparatus for accurately and reproducibly determining the amount of volatile condensable material given off by polymeric materials.

Another object of this invention is to provide an apparatus for simultaneously determining the amount of volatile condensable material evolved by several samples of a polymeric material.

A further object of this invention is to provide an apparatus for determining the amount of volatile condensable material evolved by polymeric materials wherein precise control can be obtained over temperature and vacuum conditions from test to test.

Still another object of this invention is to provide an apparatus for determining the amount of volatile condensable material evolved by polymers in a relatively short period of time.

SUMMARY OF THE INVENTION

The foregoing and other objects of this invention are obtained by the utilization of an apparatus wherein the polymer samples are disposed in a pluarlity of adjacent enclosed compartments or chambers separated one from the other. The samples of polymeric materials are disposed in the chambers. Each chamber has an outlet whereby the volatile materials from the polymers can escape. The outlets are directed to a plate with one plate being provided for each adjacent chamber. The plates are generally threadably mounted on a single support structure which has cooling coils therein so as to control the temperature of the plates. The volatile condensable material that thus evolves from the polymer sample in the heated chamber is caused to condense on the cooled plates. The plates are then removed and weighed. The weight of the plates before and after the run will give a determination of the amount of volatile condensable material. Weighing the sample of the polymer before and after the test and comparing that weight with the weight of the volatile condensable material obtained will further give an indication of the amount of volatile non-condensable material also formed, as can be readily appreciated. The chambers and the cool plates are all maintained in a vacuum environment of such a degree that the mean free path of molecules leaving the polymeric substance under test is many times longer than the distance between a chamber outlet and its corresponding cool plate. A baffle arrangement is provided between the heated compartments and the collector discs so that the volatile materials from one compartment can not directly condense onto adjacent discs but only on the one associated with that sample. The baffle arrangement additionally, however, provides for the volatile non-condensable material to escape from the system through the vacuum line. In a first embodiment of this invention, the compartments for the samples are machined out of a single solid piece of suitable thermally conductive material such as copper, with for example, 11 or 12 such compartments on one piece. Generally there are two such strips of compartments in a given apparatus. The collector discs are disposed on a support of a flat sheet or plate of material of high thermal conductivity having cooling coils welded thereto. The collector plate is disposed adjacent to and spaced from the collector disc by a suitable mount means. The baffle plate is located between the chamber strip and the cooled collector plate and is thermally insulated from the chamber strip and the collector plate. In this first embodiment, the individual compartments are quite small and thus the samples are referred to as "micro" samples. In the second embodiment, rather than a single strip, the compartments are formed of individual separate spheres with heating coils mounted on their outer surfaces. Each sphere has an outlet directed to an associated cooled disc mounted on a suitable support plate. In this second embodiment, the spheres are capable of containing significantly larger samples which are referred to as "macro" samples. It is believed that the invention will be better understood from the following detailed description and drawings in which:

FIG. 4 is a section view taken along lines 4—4 of FIG. 1.

FIG. 5 depicts a typical support structure for maintaining the device within the vacuum jar.

FIG. 7 is a side view taken along line 7—7 of FIG. 6.

FIG. 9 is a sectional view taken along lines 9—9 of FIG. 6 showing the particular relationship of the chambers to the cooled collector disc.

FIG. 10 is a pictorial view of a boat for containing a sample used in the invention method.

Figure 1:
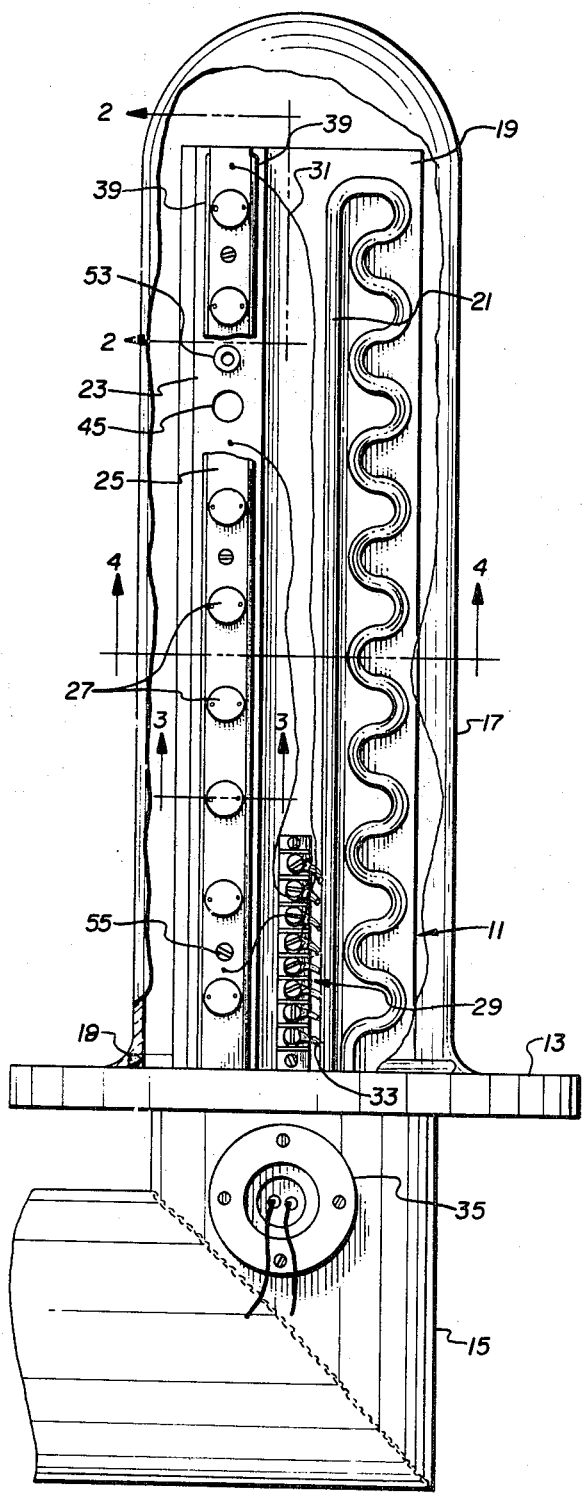
FIG. 1 is a pictorial representation of the first embodiment of this invention for making micro VCM determinations.

Turning now to FIG. 1 there is seen micro VCM device 11 of this invention mounted on a platform 13 which is affixed to a vacuum line 15. Device 11 is shown enclosed in a glass bell jar 17 which is also seated on the platform 13. Apertures (not shown) are disposed in the mounting platform 13 adjacent the base of the device 11 of this invention, permitting a vacuum to be drawn within the confines of the bell jar 17. An O-ring seal 18 is disposed at the base of the jar 17 so as to form a vacuum tight seal with the platform 13. The device 11 seated in bell jar 17 is comprised of at flat cooling plate 19, having cooling coils 21 welded thereto on opposite faces, with one cooling coil adjacent to each longitudinal edge of the plate 19. Water passes through the coils to achieve the desired temperature. Mounted spatially from the cooling plate 19 are baffle plates 23 with each plate 23 being disposed on the side of the plate opposite where the coil is mounted as will be particularly seen in FIG. 4 and explained in relation thereto. Adjacent to the baffle plate 23 is a chamber bar 25, having a plurality of chambers therein covered by plates 27. A ceramic electrical terminal strip 29 is mounted on the base support structure for holding the device 11. Thermocouple leads 31 affixed to the cooling plate 19 and chamber bar 25 are connected to the terminal strip 29. Leads 33 from the terminal strip in turn are directed through the vacuum line 15 through a conventional glass seal arrangement 35.

Figure 2:
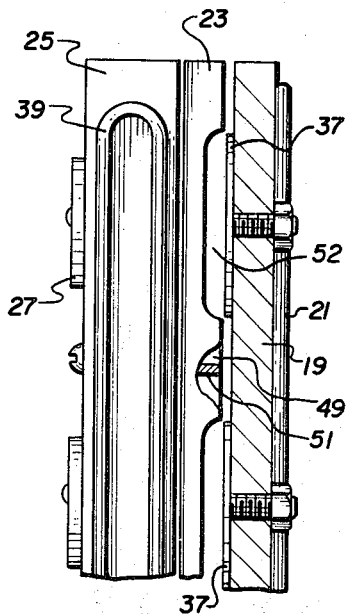
FIG. 2 is a sectional view taken along lines 2—2 of FIG. 1.
Figure 3:
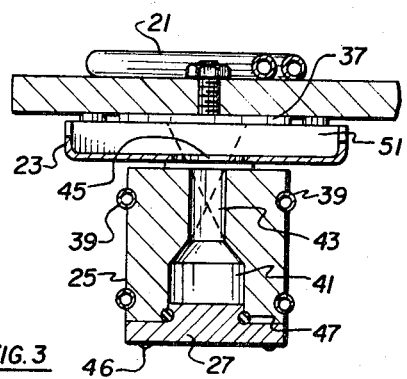
FIG. 3 is an enlarged view of section taken along lines 3—3 of FIG. 1, showing in detail the relationship of the sample chamber and collector discs.

Turning to FIG. 2 there is seen a side view of the device wherein a flat collector plate 37 is threadably secured by screws to the cooling plate 19. The collector plate 37 is preferably made of copper or aluminum or other material which is highly thermally conductive. Baffle plate 23 is shown disposed adjacent to the chamber bar 25. As seen, a sheathed resistive heating coil 39 is welded along the sides of the chamber bar 25. As seen in FIG. 3, the chamber bar has formed therein bored out compartments or chambers 41. The compartments 41 communicate with a cylindrical outlet passage 43 directed toward the baffle plate 23. Baffle plate 23 has a corresponding aperture 45 formed therein adjacent the outlet 43 from the chamber 41. Thus the path from compartment 41 to the collector plate or disc 37 is defined by an opening of large size in comparison with the comparment size 41 as seen. The dimensions of the outlet 43 and the corresponding aperture 45 in the baffle 27 are such that the molecules of volatile condensible material leaving chamber 41 impinge well within the confines of the collector disc 37 and do not encounter the baffle. As previously indicated, the vacuum in the device should be controlled such that the mean free path of the molecules of polymer is many times the distance between the chamber and the collector disc. This insures that the molecules will proceed unimpeded by possible collisions with environmental molecules to contact the collector plate. Thus, the closer the chamber is to the collector plate, the less vacuum is required since the path of polymer molecules is reduced.

The cover plate 27 is secured by screws 46 and has an O-ring seal 47 to prevent any leakage of the volatile material. The chamber bar together with the cover plates are preferably formed out of copper so as to be heat conductive and responsive to the heating coil 39. Thus, as can be seen, the baffle separator plate 23 serves to enclose the area between the chamber bar 25 and the disc 37 into indiviual compartments about each disc. This is effected by side tab portions 49 as seen in FIG. 2 between each disc 37, and divider plate 51. Divider plates 51 extend between the tab portions 49. Side openings 52 formed between the tab portions 49 adjacent to the disc 37 provide for exiting of the volatile non-condensable gases away from the disc area without any cross-contamination between adjacent discs.

Turning now to FIG. 4 there is shown details of a means for mounting the chamber bar 25 and baffle plate 23 relative to the cooling plate 19. As can be readily appreciated, since the cooling plate 19 is kept at a much lower temperature than the chamber bar 25, it is important that the two be thermally isolated from each other. Additionally, it is desirable that the baffle plate 23 be further insulated from either of the cooling plate or heated chamber bar, so as not to detract by means of conduction from the effects of these two elements. There are a plurality of cylindrical insulators 53 extending from the cooling plate into bored-out passages 55 in the chamber bar 25. The length of the insulator 53 which may be of Teflon or similar material is sufficient to dispose the chamber bar 25 a distance from the cooling plate 19 so as to permit location of the baffle plate 23 therebetween without a touching of the baffle plate to either the cooling plate 19 or the chamber bar 25. An elongated screw 57 passes through the center of the insulator and secures the chamber bar 25 directly to the cooling plate 19. The contact area of the screw 57 is so small that there is no concern with regard to the conductivity between it and the chamber bar. A plurality of insulators 59 likewise separate the baffle plate 23 spatially from the cooling plate 19. The insulators 59 are affixed by screws 61 to the cooling plate 19 in the same manner as described with regard to the insulators 55 and used for the chamber bar. As can be appreciated, the insulators for both the chamber bar 25 and baffle 23 are disposed at locations intermediate of the area surrounding the collector disc. An example of the position of an insulator 53 is for the chamber bar, is seen in the cutaway portion of FIG. 1.

Turning now to FIG. 5, brackets 63 and 65 respectively are affixed to each face of the cooling plate 19 and serve to support the structure. The support brackets 63 and 65 can be constructed of a suitable material such as aluminum plate and have a width equivalent to the width of the terminal strips 29. The strips 29 are supported from the face of the bracket by stand-off insulators 67 which serves to prevent thermal contact between the strips and the support brackets.

Figure 6:
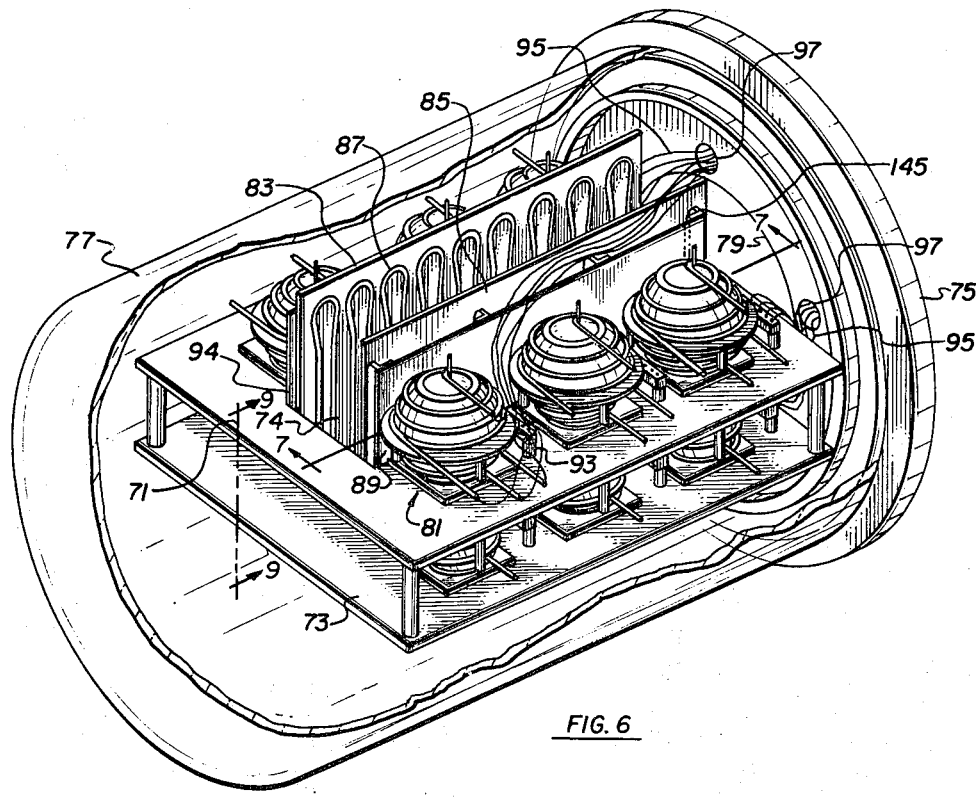
FIG. 6 is a pictorial view of a second embodiment of this invention for obtaining macro VCM determinations.

The macro VCM embodiment of this invention as illustrated in FIG. 6 utilizes two parallel supporting racks 71 and 73, affixed to base plate 75 of a vacuum chamber. A removable bell jar 77 encloses the entire assembly when a vacuum is drawn through opening 79 in the base plate 75. The pumps utilized to draw the vacuum on the device are conventional and not shown. Each shelf 71 and 73 has a plurality of spherical sample shells or chambers 81 mounted thereon. Normal to the supporting shelfs 71 and 73 and passing through the center 74 thereof are two cooling plates 83 and 85, having coolant coils 87 welded thereto through which cooling water can flow in the same manner as described with regard to the micro VCM device. Between the cooling plates and the sample spheres are baffles 89 and 91 respectively, which serve to prevent the gases from passing between individual cells in the same manner as described also with regard to the micro VCM device. Mounted on support shelves 71 and 73 adjacent each spherical sample chamber 81 are terminals 93, to which are connected the heating and thermocouple lines leading from the spheres to outside of the chamber. The electrical lead lines 95 exit the vacuum chamber through a plurality of openings 97 in the face plate 75.

As particularly seen in FIG. 7, showing a side view of the partially assembled macro VCM device of this invention, bottom shelf 73 is supported by two brackets 99 disposed on each side of the center aperture 74. The brackets 99 are secured by angles 103 to face plate 75. Additionally, as seen in this view, the shelves 71 and 73 are also affixed by angles 105 to the face plate. At their furthest extremity from the face plate the two shelves are supported one from another by rods 107. In this particular view one can clearly see located adjacent the top shelf polished aluminum collector plates 109 affixed to the cooling plate 85, while adjacent the lower shelf 73 there is seen in position the baffle plate 89 having apertures 111 therein for passing the volatile material through to the collector plates 109.

Figure 8:
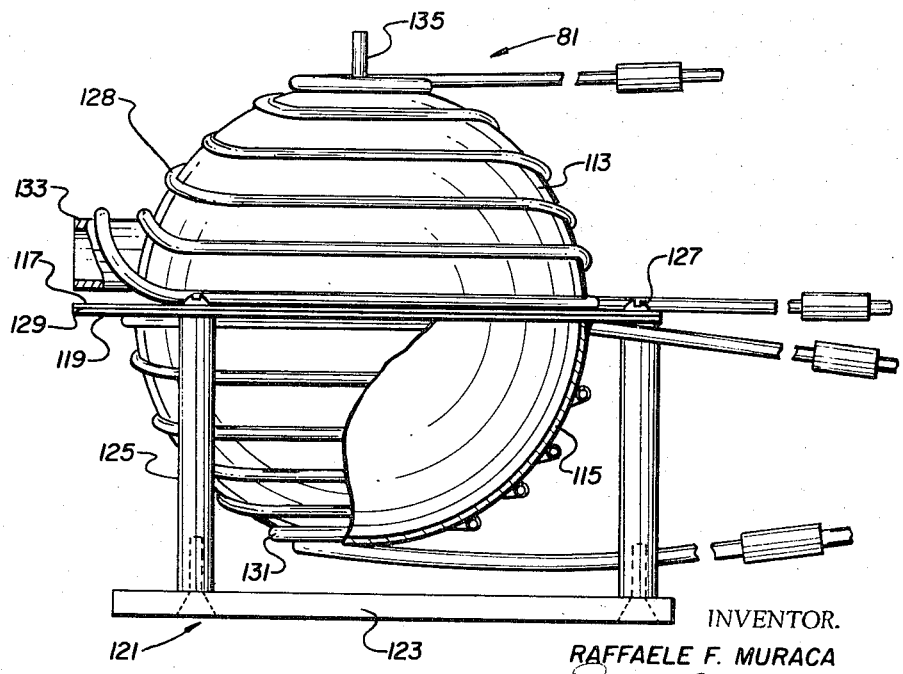
FIG. 8 is a pictorial representation of an individual chamber used for heating samples for the device shown in FIG. 6.

Turning to FIG. 8 there is seen the spherical chamber 81 for containing the samples to be tested in accord with this invention. The cell 81 is comprised of two equal halves 113 and 115. Each half is provided with mating flanges 117 and 119 respectively which serve to join the two halves together at their mid portion, as well as serving to support the unit from a stand 121. The stand 121 has a base 123 and three vertical standoffs 125 which are threadably connected by screws 127 to the flange portions of the two half-spheres. Separating the half-spheres is a Teflon seal 129 which prevents a leakage of any of the gaseous material. Each half sphere has welded to its outer surface a sheathed resistive heating element 128 and 131 respectively. The leads to or from the coils are connected to the terminals 93 adjacent each sphere. In turn, the leads to the terminals are connected to suitable controls outside the device. The top cell 113 is provided with a tubular outlet 133 which is aligned with the aperture 111 in the baffle plate 89, so that the emitted gases can leave the cell to be directed against collector plates. Additionally, a copper terminal 135 is shown at the apex of the top half sphere 113. The copper terminal 135 is affixed to a constantan thermocouple lead and this thermoelectric combination is used to determine the temperature within the cell. The sample cell may be constructed of other conductive materials, but when copper is used the temperature of a number of spheres, N, can be monitored by $N+1$ thermal leads.

Attention is directed to FIG. 9 to more clearly show the relationship of the sample cell 81 to the adjoining baffle and cooling plates. The base 123 of the support structure for the cell 81 is affixed by screws 137. The spherical sample shell 81 together with the support structure 121 is shown in dotted outline since in this view the basic support structure without the sample shell is depicted. In order, however, to understand the relationship of the cell to the associated equipment, it is shown in dotted form for the sake of convenience in relation to the upper shelf 71. As shown, there are two separate baffle plates 91 and 139, one affixed to the upper shelf 71 and the other affixed to the bottom shelf 73. Angles 141 and 143 respectively hold the baffle plates 91 and 139 to the upper and lower shelves respectively. Thus in the total device there are four separate baffle plates, two affixed to the upper shelf 71 with each adjacent the three cells shown on each side, and two similarly disposed baffle plates on the lower shelf. As seen, the baffles have side tab portions 145 which extend inwardly toward the cooling plate 83 and serve to isolate one collector disc 109 from an adjacent one.

The shelves 71 and 73 are isolated from the cooling plate 83 by Teflon strips 145 and 147 respectively. This serves to prevent undue dissipation of the cooling effect of cooling plate 83 into the adjoining hardware. A support angle 149 secures the top support shelf 71 to the cooling plate 83 and additionally serves to hold in place the insulator strip 146. The bottom insulator strip 147 is secured to the bottom support angle 99 by a metal strip 151. As seen, the cooling plate 83 rests on top of the strip 151 and is thus supported by it. Flat spacer strips 153 and 155 respectively serve to maintain the proper distancing between the cooling plate 83 and the support angles 141 and 143 for the baffle plates. Thus as can be seen from this view, the cooling plate 83 is essentially insulated from the remainder of the system and the baffle plates 91 and 139 are also likewise suspended and effectively isolated from the system. Additionally, as seen in the drawing, the terminal strip 93 is supported from the shelf 73 by an insulated stand-off 157, electrically insulated from the device. The sample disc 109 can be made of various polished metals of high thermal conductivity. A typical example in this embodiment is polished aluminum. The discs are held in place by screws 159 to the cooling plate 83 which is cooled by water passing through the coils 87. The apertures 111 in the baffle plate are aligned with the exit 133 from the sample cell so as to prevent passage of the exhaust gas to the cooled collector disc 109, the same manner as described with regard to the micro VCM apparatus.

Thus, as can be seen from the description of the invention, both the micro VCM apparatus and the marco VCM apparatus effectively operate in the same manner utilizing the same principle of operation. The advantage of these devices is that in both of them the containers or cells in which the samples are disposed can be precisely controlled temperature wise, so that the temperature for example of 125° C. can be exactly maintained in each individual cell. Further, the thermocouples demonstrate that the individual collector discs are maintained at the temperature of the collector plate which is water-cooled to, for example, 25° C. Thus, in each sample tested the conditions of heating and cooling are absolutely identical and since the geometrical arrangement of all components are absolutely identical in every test, the quantities of matter collected on the collector discs are reproducible.

In utilizing the micro VCM apparatus of this invention, the loading of comminuted samples is facilitated by aluminum foil boats 161 as seen in FIG. 10 formed so as to fit the contour of the circular sample compartment cell 41. The boats 161 are first degreased and oven-dried prior to use. The polished collector plates 37, which in this example are of copper, are cleaned in a dilute nitric acid solution or other suitable cleaner. In utilizing finished polymers for making determinations, it is preferable to obtain representative portions of the sample and avoid cutting from the edges or the surface. As to adhesive sealants and the like, they may be poured directly into the previously weighed aluminum boats before curing, or cut from a large form after cured. Paints, varnishes, coatings and the like may be applied by brushing or dipping small pieces of clean and weighed fine-mesh stainless steel screen. The screen is then placed in a weighed aluminum boat. Tapes and the like can be rolled tightly to fit within the weighed aluminum boats. After the samples are prepared they are placed in the boats as indicated.

Samples and boats are then placed in a 50% humidity chamber for at least 24 hours prior to the initial sample weighing. The conditioned samples are then weighed and placed in the sample compartments of the micro VCM apparatus and their location noted. The copper collector plates 41 are then weighed and affixed to the apparatus noting the location reference to the specific samples. When the samples and the collector plates are positioned, the apparatus is covered with a bell jar and evacuation is begun. At $10^{-3}$ torr the cooling system for the collector plates is initiated. When the system is at least $10^{-5}$ torr the temperature of the copper block containing the cells is then elevated to 125° C. After the samples have been maintained at 125° C., for 24 hours, the system is then allowed to cool in vacuo to a temperature of at least 50° C. The system is then purged with dry nitrogen or helium. After this, the samples and collector plates are removed in a systematic order and stored in appropriate desiccators. Weighing of the samples is then begun after one half hour storage in the desiccator, in the order of their removal from the thermal vacuum system. Then the collector plates are weighed. The data normally reported is the sample weight in grams, the sample weight loss in weight percent, and the VCM or volatile condensable material in weight percent.

In utilizing the marco VCM device of this invention, it has been found that samples should have a thickness of less than $1/8''$. For elastomers it is generally preferable to have a thickness of $1/16''$. These are normally used as is and are cut to appropriate sizes. The dimensions should be recorded before utilization. Films, tapes and the like can be rolled loosely before placing in the spherical sample cells. In utilizing plastics, if the thickness exceeds $1/8''$ the plastic ssould be cut or sawed into strips of less than $1/8''$ dimension. Adhesives, sealants, and the like can be spread to about $1/16''$ thickness on clean and weighed aluminum foil strips of appropriate size before curing. After curing, they may be rolled loosely and put within the spherical sample cells. Coatings may be brushed or dipped onto weighed copper wire coil. An example of coil would be a 3-foot length of 18 gauge. The samples are first weighed on an analytical balance. The collector plates are then so weighed, and the plates and samples are placed in the marco VCM apparatus. The system is then evacuated to $10^{-3}$ torr and the refrigeration is started. Evacuation is continued to $10^{-5}$ torr. At this time the temperature of the sample compartment is brought to 125° C.

Once the temperature in the cells are obtained, timing is started. Every 24 hours a record should be made of the sample temperature, the collector plate temperature, and the pressure in the apparatus. The sample is maintained at the 125° C. for the prescribed period. The heat is then reduced and the sample allowed to cool under high vacuum to less than 50° C. After this, the system is vented with helium or nitrogen and the samples and collectors plates removed to desiccators. They are then weighed within one hour after removal. In order to achieve an indication of the effect of varying time perriods on the amount of volatile condensable material given off, replicate samples should be run for periods of 24, 48, 96 and 330 hours. Thus, the weight loss and the VCM as weight percent can be reported for the same material as it relates to the varying time of exposure to the heating conditions.

While the apparatus and method of this invention has been described and illustrated in detail, it is to be clearly understood that this is intended by way of illustration and example only and is not to be taken by way of limitation, the spirit and scope of this invention being limited only by the terms of the following claims.

What is claimed is:

1. A device for collecting volatile condensable material given off by polymers under controlled conditions of temperature and pressures, comprising:
   enclosed chambers for containing samples of said polymers, said chambers having an outlet for escaping gases,
   means for controllably heating said chambers,
   a separate disc adjacently spaced from and aligned with the outlet of each chamber for collecting said volatile condensable material,
   and means for controllably cooling said collecting discs, said means comprising a plate having cooling coils thereon, wherein said discs are removably secured to said plate.

2. The device of claim 1 wherein a plurality of said chambers and their outlets are adjacently co-aligned in the same plane and additionally comprising:

baffle means disposed between said outlets from said chambers and said collector discs for preventing gases from one chamber mixing with those emitted from adjacent chambers.

3. The device of claim 2 wherein said baffle means has openings therein of a size sufficient to pass all the molecules of polymer evolved from said chambers directly to said collector discs without any contact with baffle means and each said collector disc has a surface sufficient to collect all molecules of polymer evolved from the corresponding chamber.

4. The device of claim 1 additionally comprising:
means for sealably surrounding and enclosing said device such that a vacuum can be established therein.

5. A device for collecting the amount of volatile condensable material given off by polymers under controlled conditions of temperature and pressures, comprising:
at least one bar of heat conductive material having individual chambers bored therein for containing polymer samples, said chambers having an outlet for escaping gases,
means for controllably heating the chambers in said bar,
a plate of conductive material disposed adjacent said bar,
means for controllably cooling said plate,
collector discs removably secured to said cooled plate, each disc being aligned with an outlet from a chamber of said bar.

6. The device of claim 5 additionally comprising:
baffle means disposed between said chamber containing bar and said discs for preventing gas emitted from one compartment from contaminating the gas emitted from adjacent compartments.

7. A device for collecting volatile condensable material given off by polymers under controlled conditions of temperature and pressures, comprising:
a plurality of hollow containers for containing polymer samples, each container having an outlet for escaping gases,
means for controllably heating said containers,
a plate of conductive material disposed adjacent said containers,
means for controllably cooling said plate,
collector discs removably secured to said cooled plate, each disc being aligned with an outlet from the adjacent container.

8. The device of claim 7 wherein the outlets of at least some of said chambers are adjacently co-aligned in the same plane and additionally comprising:
baffle means disposed between said containers and said discs for preventing gas emitted from one container from contaminating the gas emitted from adjacent containers.

9. The device of claim 7 wherein said containers are spherically shaped.

References Cited

UNITED STATES PATENTS

| | | | |
|---|---|---|---|
| 2,602,825 | 7/1952 | Flosdorf | 23—264 |
| 2,828,623 | 4/1958 | Benedict | 73—76 |
| 2,869,360 | 1/1959 | Stein | 73—76 |
| 3,205,700 | 9/1965 | Lively et al. | 73—19 |
| 3,360,985 | 1/1968 | Christian | 73—76 |

JAMES J. GILL, Primary Examiner

H. GOLDSTEIN, Assistant Examiner